(12) United States Patent
Nambannor Kunnath et al.

(10) Patent No.: US 12,609,839 B2
(45) Date of Patent: Apr. 21, 2026

(54) PEER-TO-PEER UPDATING OF OFFLINE DEVICES

(71) Applicant: Omnissa, LLC, Mountain View, CA (US)

(72) Inventors: Ramanandan Nambannor Kunnath, Bangalore (IN); Rohit Pradeep Shetty, Bangalore (IN)

(73) Assignee: Omnissa, LLC, Mountain View, CA (US)

( * ) Notice: Subject to any disclaimer, the term of this patent is extended or adjusted under 35 U.S.C. 154(b) by 93 days.

(21) Appl. No.: 18/108,032

(22) Filed: Feb. 10, 2023

(65) Prior Publication Data

US 2024/0214221 A1      Jun. 27, 2024

(30) Foreign Application Priority Data

Dec. 22, 2022      (IN) .............................. 202241074513

(51) Int. Cl.
| | |
|---|---|
| *H04L 9/32* | (2006.01) |
| *G06F 8/65* | (2018.01) |
| *H04L 9/40* | (2022.01) |

(52) U.S. Cl.
CPC .............. *H04L 9/3268* (2013.01); *G06F 8/65* (2013.01); *H04L 63/20* (2013.01)

(58) Field of Classification Search
CPC .......... H04L 9/3268; H04L 63/20; G06F 8/65
See application file for complete search history.

(56) References Cited

U.S. PATENT DOCUMENTS

| | | | | |
|---|---|---|---|---|
| 2016/0316348 | A1* | 10/2016 | Trevathan | ........... H04W 68/005 |
| 2017/0048097 | A1* | 2/2017 | Kavatage | ................ H04L 45/22 |
| 2021/0014921 | A1* | 1/2021 | Cleaver | ..................... G06F 8/65 |
| 2021/0211418 | A1* | 7/2021 | Nambannor Kunnath | .................. |
| | | | | H04W 12/069 |
| 2022/0377550 | A1* | 11/2022 | Mataic | .................. H04W 76/40 |

* cited by examiner

*Primary Examiner* — Amir Mehrmanesh
*Assistant Examiner* — Forrest L Carey
(74) *Attorney, Agent, or Firm* — Kim & Stewart LLP

(57) ABSTRACT

The present disclosure relates to peer-to-peer (P2P) updating of offline client devices by an online client devices. Client devices can be enrolled with a management service as managed devices. If a device lacks the ability to contact the management service, an online client device that is in communication with the offline client device can deliver updates to software, policies, or other data.

17 Claims, 3 Drawing Sheets

PEER-TO-PEER UPDATING OF OFFLINE DEVICES

RELATED APPLICATIONS

Benefit is claimed under 35 U.S.C. 119(a)-(d) to Foreign Application Serial No. 202241074513 filed in India entitled "PEER-TO-PEER UPDATING OF OFFLINE DEVICES", on Dec. 22, 2022, by VMware, Inc., which is herein incorporated in its entirety by reference for all purposes.

BACKGROUND

In an enterprise environment, users often use multiple devices for various purposes. For example, a user might have a laptop, a tablet, a phone, and potentially other devices that are utilized to access enterprise resources. Information technology administrators can utilize a management framework that allows for user devices to be enrolled with a management service that can enforce enterprise security and compliance policies. The management service can also facilitate providing software updates and patches to the enrolled devices to further information security and compliance priorities. In some cases, enrolled devices might be offline for extended periods of time, during which important updates are provided to enrolled devices. An offline device can be in a situation where it is unable to receive these updates from the management service, leading to a period of time where the offline device is in a compromised state.

BRIEF DESCRIPTION OF THE DRAWINGS

For a more complete understanding of the embodiments and the advantages thereof, reference is now made to the following description, in conjunction with the accompanying figures briefly described as follows.

DETAILED DESCRIPTION

Figure 1:
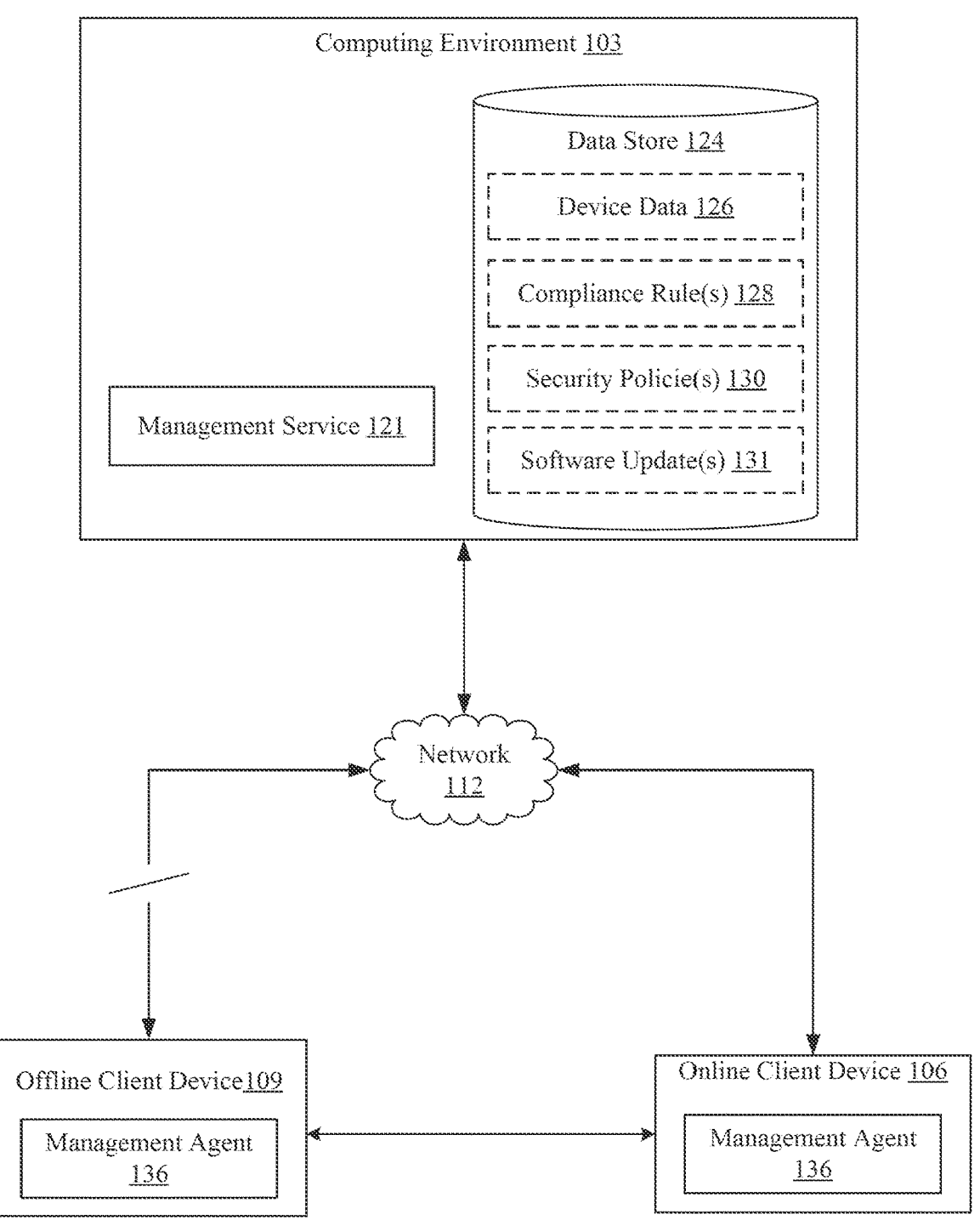
FIG. 1 shows an example of a networked environment 100 according to various embodiments of the present disclosure.

The present disclosure relates to peer-to-peer (P2P) updating of offline devices that are enrolled as managed devices with a management service. Users in an enterprise environment can have multiple devices that are enrolled as managed devices. For example, a user might have a tablet device, a laptop computer, a smartphone, a wearable device, and potentially other devices that are enrolled with the management service. The devices can be managed by a management service that is tasked with deploying security policies, security keys or certificates, software updates, and enforcing other enterprise policies on a client device that can be specified by administrators of the management service.

To effectively manage devices, the management service often relies upon device "check-ins" whereby managed devices, or a component installed or running on a managed device, periodically reports device status information to the management service. These device check-ins can also be referred to as device heartbeat data. A device check-in can take the form of a device identifier along with device status information that the management service can monitor, such as operating system version, network address, geolocation data, and other data from which the management service can determine whether the device requires any action to be taken on the device. In response to receiving a device check-in, the management service can determine whether any needed updates to policies or software on the managed device are needed and respond to the managed device with the updates or policies. Or, the management service can respond with instruction on where and how a management component on the client device can retrieve a software update, or what modifications to the configuration of the client device that should be made by the management component.

However, one or more of the user's enrolled devices can be offline for an extended period of time and without network access. For example, a tablet or wearable device might not have internet access or might be left in airplane mode where only Bluetooth connectivity is enabled on the device. While the device is offline for an extended period of time, there might be high priority updates to compliance policies, security policies, encryption keys or certificates, or software updates that are sent by the management service to managed devices. However, offline devices might be in communication with another enrolled device of the user that is in communication with the management service. Such an online device might be able to communicate with the offline device through another communication channel, such as a Bluetooth connection, Wi-Fi direct, a direct wired connection, or another localized or alternative connection. Therefore, examples of the disclosure can provide a management service that can provide software updates, security policies, compliance policies, or other data to offline devices that are enrolled as managed devices through an online device.

FIG. 1 shows an example of a networked environment 100 according to various embodiments. The networked environment 100 can include a computing environment 103, and an online client device 106 in communication through a network 112. The networked environment also includes an offline client device 109 that is in communication directly with the online client device 106 but that cannot communicate with the computing environment 103 via the network 112. In other words, the offline client device 109 lacks access or the ability to access the network 112. The network capability of the offline client device 109 might be disabled or non-functional, for example.

The network 112 can include the Internet, intranets, extranets, wide area networks (WANs), local area networks (LANs), wired networks, wireless networks, other suitable networks, or any combination of two or more such networks. The networks can include satellite networks, cable networks, Ethernet networks, telephony networks, and other types of networks. The network 112 can include wide area networks (WANs) and local area networks (LANs). These networks can include wired or wireless components or a combination thereof. Wired networks can include Ethernet networks, cable networks, fiber optic networks, and telephone networks, such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (e.g., WI-FI®), BLUETOOTH® networks, microwave transmission networks, as well as other networks relying on radio broadcasts. The network 112 can also include a combination of two or more networks 112. Examples of networks 112 can include the Internet, intranets, extranets, virtual private networks (VPNs), and similar networks.

The computing environment 103 can be embodied as one or more computers, computing devices, or computing systems. In certain embodiments, the computing environment 103 can include one or more computing devices arranged, for example, in one or more servers or computer banks. The computing device or devices can be located at a single installation site or distributed among different geographical locations. The computing environment 103 can include a plurality of computing devices that together embody a hosted computing resource, a grid computing resource, or other distributed computing arrangement. In some cases, the computing environment 103 can be embodied as an elastic computing resource where an allotted capacity of processing, network, storage, or other computing-related resources vary over time. As further described below, the computing environment 103 can also be embodied, in part, as certain functional or logical (e.g., computer-readable instruction) elements or modules as described herein.

The computing environment 103 can operate as an environment for mobile device management or a Unified Endpoint Management (UEM) platform that can manage the online client device 106 and secondary client device(s) 109. In that context, the computing environment 103 can execute a management service 121 and potentially other applications. To this end, the operating system and application ecosystem associated with managed devices can provide various APIs and services that allow client managed devices to be enrolled as managed devices with the management service 121. The computing environment 103 can also include or have access to a data store 124.

The data store 124 can include memory of the computing environment 103, mass storage resources of the computing environment 103, or any other storage resources on which data can be stored by the computing environment 103. The data store 124 can include one or more databases, such as a structured query language (SQL) database, a non-SQL database, or other appropriate database. The data stored in the data store 124, for example, can be associated with the operation of the various applications or functional entities described below. The data store 124 can include device data 126, compliance rules 128, security policies 130, software updates 131 and potentially other data.

Device data 126 can represent information about devices that are enrolled as a managed device with the management service 121. Device data 126 can include a device identifier, a device type, device operating system, a user account associated with the enrolled device, and other identifying or status information about a device. In one example, the device data 126 can identify the last time a managed device has performed a device check-in with the management service 121. Accordingly, the management service 121 can determine which compliance rules 128, security policies 130, software updates 131, and/or other data has not been provided to a managed device since the last device check-in. The management service 121 can then provide the rules, policies or updates to the managed device or instruct the managed device to retrieve them from a particular location.

The device data 126 can also identify the latest compliance rules 128, security policies 130, and/or software updates 131 that have been provided to the enrolled device. The device data 126 can be populated by information received from a managed device when the device performs a device check-in or provides heartbeat data to the management service 121. A management agent 136 running on an online client device 106 or offline client device 109 can perform the device check-in on behalf of the device.

Device data 126 can include records corresponding to client devices 106 that are enrolled as managed devices with the management service 121. A record within device data 126 can include various security settings selected for enforcement on a client device 106 that is enrolled with the management service 121. Accordingly, a device record can include a device identifier associated 124 with a device, such as the client device 106, a security posture, and potentially other data. In some examples, device data 126 can also identify a user associated with a client device 106. A device record can also store other device specific information, such as a device type, operating system type or version, applications that are required or optional for the device, or an enrollment status of the device. In this scenario, the device data 126 can also indicate whether a managed device is a computing device or a peripheral device, such as a printer, scanner, or other device that can be deployed in an environment and associated with a record in a directory service.

Various compliance rules 128 can be enforced on client devices 106 that are enrolled as managed devices with the management service 121. For example, a compliance rule can specify that a client device 106 is required to be off or in a low power "sleep" state during a specified time period. Another compliance rule can specify that a client device 106 is required to be on or in a normal operation "awake" state during a specified time period. As another example, a compliance rule can specify that a client device 106 is prohibited from rendering content that has been designated as confidential.

The management service 121 can administer the operation of online client device 106 and secondary client device(s) 109 that are enrolled or otherwise registered with the management service 121. To this end, the management service 121 can also provide mechanisms for the online client device 106 or an offline client device 109 to enroll or otherwise register with the management service 121. The management can also install or cause to be installed various applications on the online client device 106 or offline client device 109 or for various configuration settings of the online client device 106 or offline client device 109 to be set to a specified value.

The management service 121 can distribute files to a client device 106 that is managed by the management service 121. For example, O/S patches or updates, executable files such as applications or application installers, documents, audio, video, or other content can be distributed by the management service 121 to managed devices.

An online client device 106 or offline client device 109, collectively referred to as manage devices or client devices, can include a processor-based system such as a computer system. Such a computer system can be embodied in the form of a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), media playback devices (e.g., media streaming devices, BluRay® players, digital video disc (DVD) players, set-top boxes, and similar devices), a videogame console, or other devices with like capability. The client devices can include one or more displays, such as liquid crystal displays (LCDs), gas plasma-based flat panel displays, organic light emitting diode (OLED) displays, electrophoretic ink ("E-ink") displays, projectors, or other types of display devices.

An online client device 106 is a managed device enrolled with the management service 121 can communicate with the management service 121 via the network 112. An offline client device 109 is a managed device that is unable to communicate with the management service 121 via the network 112.

The online client device 106 and offline client device 109 can be configured to execute various applications such as a management agent 136 and potentially other applications. The management agent 136 can be installed on the online client device 106 or offline client device 109 to facilitate management of the online client device 106 by the management service 121. The management agent 136 can be installed with elevated privileges or be effectuated through operating system APIs to manage the online client device 106 on behalf of the management service 121. The management agent 136 can have the authority to manage data on the online client device 106; install, remove, or disable certain applications; or install configuration profiles, such as VPN certificates, Wi-Fi profiles, email profiles, or other profiles for configuring various functions or applications of the online client device 106 or offline client device 109.

The management agent 136 can allow the offline client device 109 and online client device 106 to communicate via a P2P communication channel. The P2P communication channel can be utilized when the offline client device 109 cannot communicate with the network 112 or the management service 121 directly. The p2p channel can be a peer to peer communication between the devices based on, for example, Wi-Fi direct, Bluetooth, Bluetooth Low Energy, near-field communication, sound detection, or other suitable methods. In one example, the p2p channel between an offline client device 109 and an online client device 106 can be encrypted with a p2p channel certificate or encryption key.

The p2p channel can also be referred to as a Secure P2P Enrolled Device (SPED) network. The SPED network is a peer to peer network formed among enrolled devices via the respective management agent 136 installed in the enrolled client devices apps relying on platform exposed nearby API's and also technologies such as BLE, Wi-Fi, sound, etc. When mission critical updates are pushed to the end user devices by the management service 121 for a specific user, the management service 121 can track which devices received the updates and which devices did not. In this scenario, SPED utilizes the management agent 136 of an online client device 106 belonging to the same user to push updates to any offline client device 109 of the same user. The management agent 136 on the online device 106 is tasked to reach out to the non-updated enrolled offline client device 109 using the SPED network. If the offline client device 109 is accessible via the SPED network, the management agent 136 can inform the management service 121 of its accessibility. The management service 121 can then provide payload for the offline client device 109 via the online client device 106 to the non-updated offline client device 109 and also inform the offline device to send a heartbeat signal or device check-in to the management service 121 via an online client device 106 that has been updated and is compliant with device which is part of the SPED network.

The SPED network can include any offline client device 109 and online client device 106 that are running the management agent 136 and enrolled under a common user account within the enterprise. Devices in proximity to one another can stitch together a network of enrolled devices using nearby API's (BLE, Wi-Fi etc) and form the SPED network.

Figure 2:
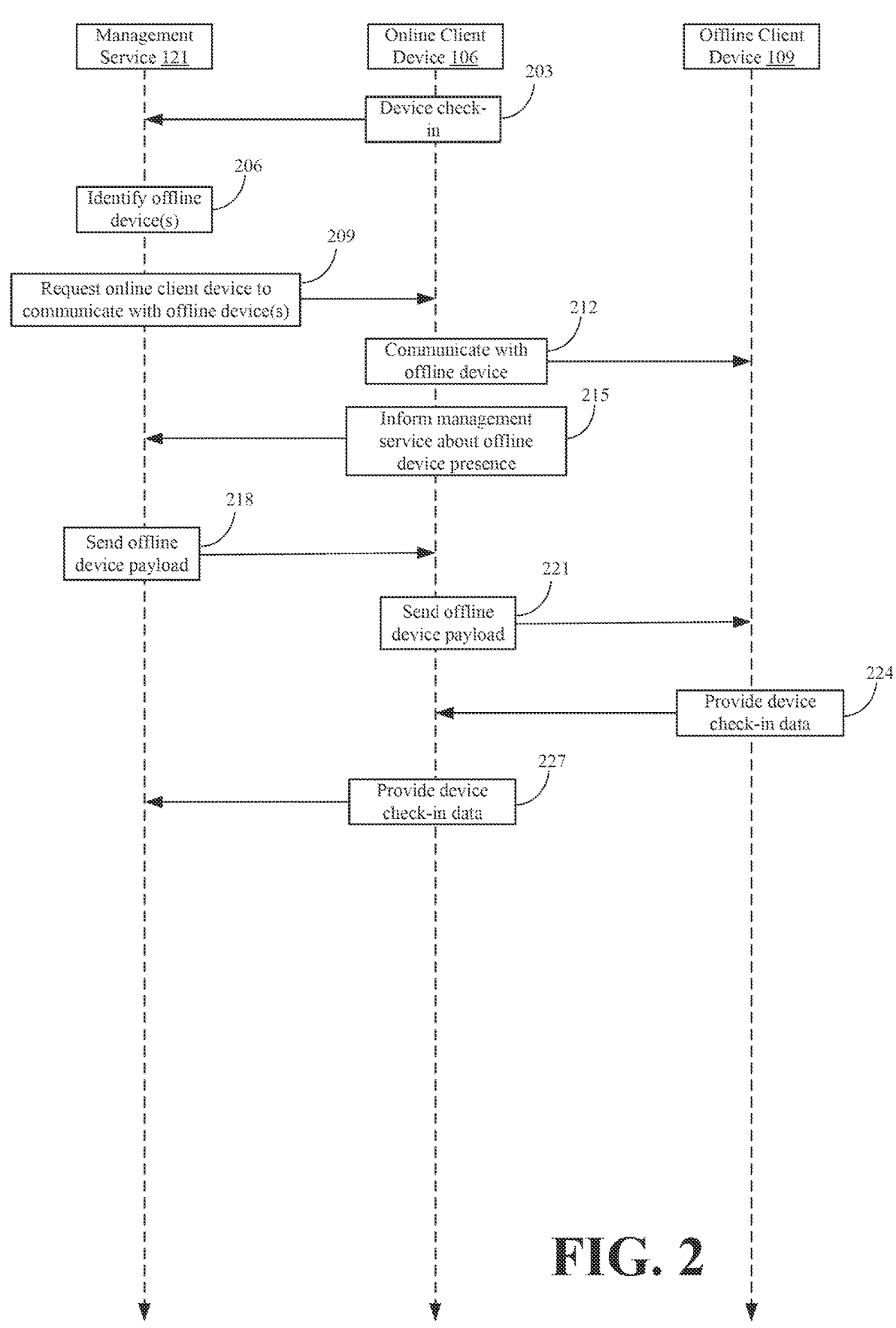
FIG. 2 shows sequence diagrams that provide examples of functionality implemented by components of the networked environment, according to various embodiments of the present disclosure.

FIG. 2 shows a sequence diagram that provides examples of functionality implemented by components of the networked environment 100. It is understood that the sequence diagram of FIG. 2 provides merely an example of the many different types of functional arrangements that can be employed to implement the portions of the networked environment 100 as described herein. As an alternative, the sequence diagram of FIG. 2 can be viewed as depicting an example of elements of a method implemented within the networked environment 100.

Turning to FIG. 2 and step 203, the online client device 106 can perform a device check-in. A device check-in can comprise the online client device 106 sending device status data to the management service 121. A device check-in can take the form of a device identifier along with device status information that the management service can monitor, such as operating system version, network address, geolocation data, and other data from which the management service can determine whether the device requires any action to be taken on the device.

At step 206, the management service 121 can assess the compliance of the online client device 106 and identify whether there are other enrolled devices assigned to the same user account that have not performed a device check-in for a threshold period of time. The threshold period of time can be configurable by an administrator.

At step 209, the management service 121 can request that the online client device 106, or the management agent 136 running on the online client device 106, attempt to establish communication with the offline devices through a SPED network. In other words, the management service 121 can request that the online client device 106 communicate with an offline client device 109 via a p2p channel if possible. The management service 121 can provide a device identifier or other identifier of one or more offline client device 109 in the request so that the management agent 136 running on the online client device 106 can attempt to contact only the identified devices in some implementations.

At step 212, the management agent 136 running on the online client device 106 can attempt to discover one or more offline client device 109 via the SPED network. The management agent 136 can attempt to communicate with one or more offline client device 109 that are identified by the management service 121. The management agent 136 running on an online client device 106 can attempt to contact a corresponding management agent 136 running on an offline client device 109 via the SPED network. If an offline client device 109 is contacted via the SPED network, the management agent 136 running on the online client device 106 can inform the management service 121 about the presence of the offline client device 109 at step 215. The management agent 136 on the offline client device 109 can provide a device identifier of the offline client device 109 to the management service 121.

At step 218, the management service 121 can provide a device payload for the offline client device 109 to the management agent 136 of the online client device 106. The device payload can be encrypted with a certificate or public key corresponding to the offline client device 109 so that the payload is inaccessible to the management agent 136 of the online client device 106. The device payload can include an indication of compliance rules 128, security policies 130, and/or software updates 131 that are intended for the offline client device 109.

At step 221, the management agent 136 of the online client device 106 can establish a connection to the offline client device 109 via the SPED network. The management agent 136 of the online client device 106 can provide the device payload to the management agent 136 of the offline client device 109. In some implementations, the management agent 136 of the online client device 106 can encrypt the device payload along with a P2P payload request with a certificate used for encrypting communications between the online client device 106 and the offline client device 109 before providing the device payload to the offline client device 109.

At step 224, the offline client device 109 can provide device check-in data to the online client device 106. The offline device would decrypt the device payload received in step 221 using the certificate utilized to encrypted P2P channel communications and then decrypt the payload from management service 121 using the device certificate or private key corresponding the public key utilized by the management service 121 to encrypt the device payload. The offline client device 109 can load new policy updates, profiles, software updates, etc. The management agent 136 of the offline client device 109 can then perform compliance checks and also encrypt its device check-in data with its private key, which can be provided to the online client device 106.

At step 227, the management agent 136 on the online client device 106 can provide the device check-in data received from the offline client device 109 to the management service 121. The management service 121 can decrypt the payload received from the management agent 136 of the online client device 106 using the device public key of the offline client device 109. The management service 121 can check the status of the offline client device 109 based upon the device check-in data and perform any necessary actions to ensure compliance of the offline client device 109 with security policies 130, compliance rules 128, or provide any other software updates 131 to the offline client device 109 via the online client device 106. The management service 121 can also update a device record corresponding to the offline client device 109 based upon the device check-in data corresponding to the offline client device 109 that is received from the online client device 106.

Figure 3:
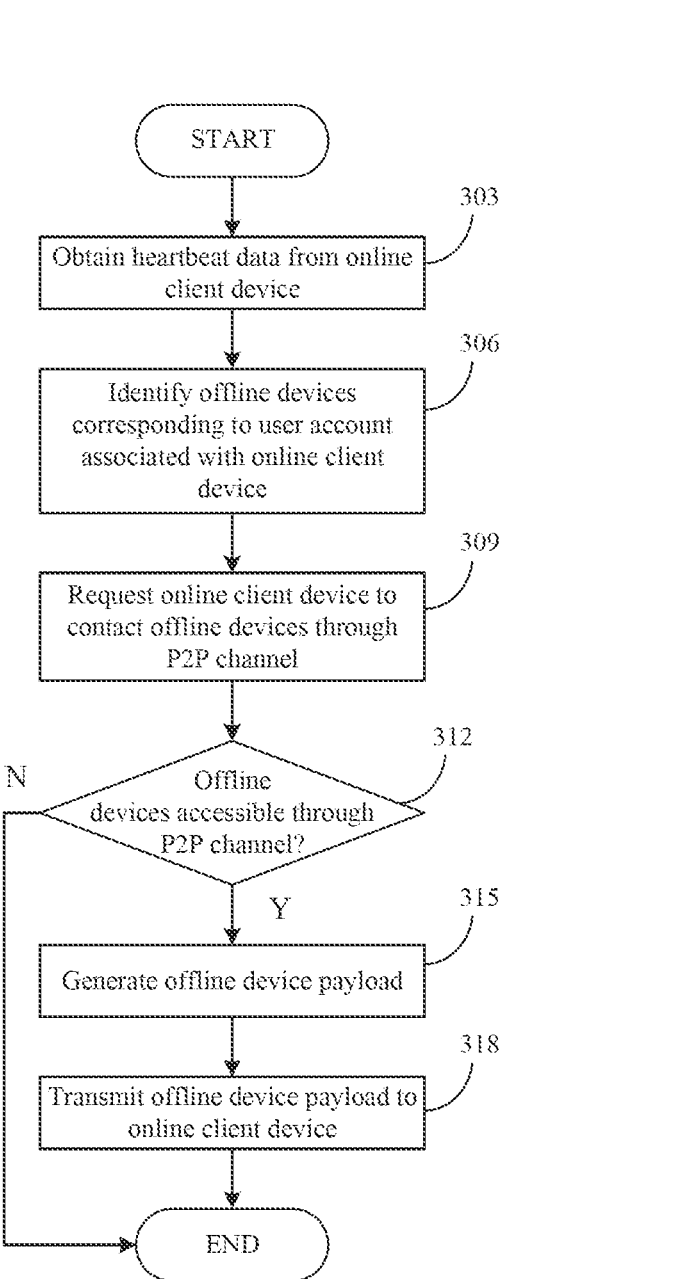
FIG. 3 shows a flowchart that provides an example of a portion of the operation of the networked environment, according to various embodiments of the present disclosure.

FIG. 3 shows a flowchart that provides an example of a portion of the operation of the management service 121. While the actions of the steps of FIG. 3 can be described as performed by a particular device or component, other components of the networked environment 100 can also perform aspects of the steps and actions.

At step 303, the management service 121 can obtain heartbeat data or a device check-in from an online client device 106. A device check-in can comprise the online client device 106 sending device status data to the management service 121. A device check-in can take the form of a device identifier along with device status information that the management service can monitor, such as operating system version, network address, geolocation data, and other data from which the management service can determine whether the device requires any action to be taken on the device. At step 306, the management service 121 can receive proximity data from the online client device 106 and the offline client device 109. The proximity data can indicate a proximity of the offline client device 109 to the online client device 106. The online client device 106 and the offline client device 109 can each generate this proximity data based on, for example, nearby Wi-Fi networks, Bluetooth, Bluetooth Low Energy, near-field communication, sound detection, or other suitable methods.

At step 306, the management service 121 can identify whether there are other enrolled devices assigned to the same user account that have not performed a device check-in for a threshold period of time. The threshold period of time can be configurable by an administrator. The identified devices can be considered as offline client devices 109 that require an update to compliance rules 128, security policies 130, or software updates 131 and that have not performed a device check-in for a threshold period of time, such as a period of hours, days, weeks, etc.

At step 309, the management service 121 can request that the online client device 106, or the management agent 136 running on the online client device 106, attempt to establish communication with the offline devices through a SPED network. In other words, the management service 121 can request that the online client device 106 communicate with an offline client device 109 via a p2p channel if possible. The management service 121 can provide a device identifier or other identifier of one or more offline client device 109 in the request so that the management agent 136 running on the online client device 106 can attempt to contact only the identified devices in some implementations.

The management agent 136 running on the online client device 106 can attempt to discover one or more offline client device 109 via the SPED network. The management agent 136 can attempt to communicate with one or more offline client device 109 that are identified by the management service 121. The management agent 136 running on an online client device 106 can attempt to contact a corresponding management agent 136 running on an offline client device 109 via the SPED network. If an offline client device 109 is contacted via the SPED network, the management agent 136 running on the online client device 106 can inform the management service 121 about the presence of the offline client device 109 at step 215. The management agent 136 on the offline client device 109 can provide a device identifier of the offline client device 109 to the management service 121.

At step 312, the management service 121 determine, based upon a response from the online client device 106, whether the are offline client devices 109 that are accessible by the online client device 106. If the online client device 106 responds to the management service 121 with an indication that there are no offline client devices 109 that are accessible by the online client device 106, the process can proceed to completion. However, if the online client device 106 responds to the management service 121 with an indication that there is one or more offline client device 109 that is accessible to the online client device 106, the process can proceed to step 315.

At step 315, the management service 121 can generate a device payload for the identified offline client device 109. The device payload can be encrypted with a certificate or public key corresponding to the offline client device 109 so that the payload is inaccessible to the management agent 136 of the online client device 106. The device payload can include an indication of compliance rules 128, security policies 130, and/or software updates 131 that are intended for the offline client device 109.

At step 318, the management service 121 can provide the device payload for the offline client device 109 to the management agent 136 of the online client device 106. The management agent 136 of the online client device 106 can establish a connection to the offline client device 109 via the SPED network. The management agent 136 of the online client device 106 can provide the device payload to the management agent 136 of the offline client device 109. In some implementations, the management agent 136 of the online client device 106 can encrypt the device payload along with a P2P payload request with a certificate used for encrypting communications between the online client device 106 and the offline client device 109 before providing the device payload to the offline client device 109. Thereafter, the process can proceed to completion.

Functionality attributed to the executable components discussed herein can be implemented in a single process or application or in multiple processes or applications. The separation or segmentation of functionality as discussed herein is presented for illustrative purposes only.

Flowcharts and sequence diagrams can show examples of the functionality and operation of implementations of components described herein. The components described herein can be embodied in hardware, software, or a combination of hardware and software. If embodied in software, each element can represent a module of code or a portion of code that includes program instructions to implement the specified logical function(s). The program instructions can be embodied in the form of, for example, source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

Although the flowcharts and sequence diagrams can show a specific order of execution, it is understood that the order of execution can differ from that which is shown. For example, the order of execution of two or more elements can be switched relative to the order shown. Also, two or more elements shown in succession can be executed concurrently or with partial concurrence. Further, in some examples, one or more of the elements shown in the flowcharts can be skipped or omitted.

The computing devices and other hardware components described herein can include at least one processing circuit. Such a processing circuit can include, for example, one or more processors and one or more storage devices that are coupled to a local interface. The local interface can include, for example, a data bus with an accompanying address/control bus or any other suitable bus structure.

The one or more storage devices for a processing circuit can store data or components that are executable by the one or more processors of the processing circuit. For example, the various executable software components can be stored in one or more storage devices and be executable by one or more processors. Also, a data store can be stored in the one or more storage devices.

The functionalities described herein can be embodied in the form of hardware, as software components that are executable by hardware, or as a combination of software and hardware. If embodied as hardware, the components described herein can be implemented as a circuit or state machine that employs any suitable hardware technology. The hardware technology can include, for example, one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more of the components described herein that include software or program instructions can be embodied in any non-transitory computer-readable medium for use by or in connection with an instruction execution system such as a processor in a computer system or other system. The computer-readable medium can contain, store, and/or maintain the software or program instructions for use by or in connection with the instruction execution system.

A computer-readable medium can include a physical media, such as, magnetic, optical, semiconductor, and/or other suitable media. Examples of a suitable computer-readable media include, but are not limited to, solid-state drives, magnetic drives, or flash memory. Further, any logic or component described herein can be implemented and structured in a variety of ways. For example, one or more components described can be implemented as modules or components of a single application. Further, one or more components described herein can be executed in at least one computing device or by using multiple computing devices.

As used herein, "about," "approximately," and the like, when used in connection with a numerical variable, can generally refer to the value of the variable and to all values of the variable that are within the experimental error (e.g., within the 95% confidence interval for the mean) or within +/−10% of the indicated value, whichever is greater.

Where a range of values is provided, it is understood that each intervening value and intervening range of values, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

A phrase, such as "at least one of X, Y, or Z," unless specifically stated otherwise, is to be understood with the context as used in general to present that an item, term, etc., can be either X, Y, or Z, or any combination thereof (e.g., X, Y, and/or Z). Similarly, "at least one of X, Y, and Z," unless specifically stated otherwise, is to be understood to present that an item, term, etc., can be either X, Y, and Z, or any combination thereof (e.g., X, Y, and/or Z). Thus, as used herein, such phrases are not generally intended to, and should not, imply that certain embodiments require at least one of either X, Y, or Z to be present, but not, for example, one X and one Y. Further, such phrases should not imply that certain embodiments require each of at least one of X, at least one of Y, and at least one of Z to be present.

It is emphasized that the above-described examples of the present disclosure are merely examples of implementations to set forth for a clear understanding of the principles of the disclosure. Many variations and modifications can be made to the above-described examples without departing substantially from the spirit and principles of the disclosure. All such modifications and variations are intended to be included herein within the scope of this disclosure.

What is claimed is:

1. A system for updating an offline client device, comprising:
 a processor and a memory;
 machine-readable instructions stored in the memory that, when executed by the processor, cause the system to at least:
  obtain device check-in data corresponding to an online client device over a network from the online client device, the device check-in data comprising device status information about the online client device, wherein the online client device is associated with a user account;

identify an offline client device associated with the user account, wherein the offline client device has failed to provide device check-in data corresponding to the offline client device for a threshold period of time;

determine, based on a device record associated with the offline client device, an update to a security policy of the offline client device;

transmit a request to communicate with the offline client device to the online client device;

generate a device payload for the offline client device, the device payload including the update to the security policy, wherein the security policy is enforced on the offline client device by a management agent executing on the offline client device;

transmit the device payload to the online client device, wherein the online client device provides the device payload to the offline client device, wherein the management agent on the offline client device receives the device payload and installs the update to the security policy on the offline client device to modify one or more security settings on the offline client device based on the update;

receive, from the online client device, the device check-in data corresponding to the offline client device, the device check-in data including a device identifier of the offline client device and device status indicating that the update to the security policy has been installed on the offline client device, wherein the offline client device transmits, to the online client device, the device check-in data corresponding to the offline client device in response to loading the device payload received from the online client device on the offline client device;

determine a compliance status of the offline client device based on the device check-in data corresponding to the offline client device received from the online client device; and update the device record of the offline client device to reflect the compliance status, which indicates that the update to the security policy has been installed on the offline client device.

2. The system of claim 1, wherein the machine-readable instructions further cause the system to at least:

encrypt the device payload using a public key corresponding to the offline client device, wherein the public key further corresponds to a device certificate generated by a management service with which the online client device and the offline client device are enrolled as managed devices.

3. The system of claim 1, wherein the online client device and the offline client device are enrolled as managed devices with a management service.

4. The system of claim 1, wherein the device payload comprises a software update for installation on the offline client device.

5. The system of claim 1, wherein the online client device transmits the device payload to the offline client device over a peer-to-peer (P2P) communication channel, wherein the P2P communication channel is encrypted using a P2P channel certificate shared between the online client device and the offline client device.

6. The system of claim 5, wherein the offline client device lacks access to the network, and wherein the offline client device transmits the check-in data corresponding to the offline device to the online device using the P2P communication channel that is separate from and not part of the network.

7. The system of claim 1, wherein the online client device includes a first management agent enrolled with a management service under a user account and the offline client device includes a second management agent enrolled with the management service under the user account, and wherein the first management agent and the second management agent establish a Secure P2P Enrolled Device (SPED) network for delivering updates between the online client device and the offline client device.

8. A method, comprising:

obtaining device check-in data corresponding to an online client device over a network from the online client device, the device check-in data comprising device status information about the online client device, wherein the online client device is associated with a user account;

identifying an offline client device associated with the user account, wherein the offline client device has failed to provide device check-in data corresponding to the offline client device for a threshold period of time;

determining, based on a device record associated with the offline client device, an update to a security policy of the offline client device;

transmitting a request to communicate with the offline client device to the online client device;

generating a device payload for the offline client device, the device payload including the update to the security policy, wherein the security policy is enforced on the offline client device by a management agent executing on the offline client device;

transmitting the device payload to the online client device, wherein the online client device provides the device payload to the offline client device, wherein the management agent on the offline client device receives the device payload and installs the update to the security policy on the offline client device to modify one or more security settings on the offline client device based on the update;

receiving, from the online client device, the device check-in data corresponding to the offline client device, the device check-in data including a device identifier of the offline client device and device status indicating that the update to the security policy has been installed on the offline client device, wherein the offline client device transmits, to the online client device, the device check-in data corresponding to the offline client device in response to loading the device payload received from the online client device on the offline client device;

determining a compliance status of the offline client device based on the device check-in data corresponding to the offline client device received from the online client device; and updating the device record of the offline client device to reflect the compliance status, which indicates that the update to the security policy has been installed on the offline client device.

9. The method of claim 8, further comprising:

encrypting the device payload using a public key corresponding to the offline client device, wherein the public key further corresponds to a device certificate generated by a management service with which the online client device and the offline client device are enrolled as managed devices.

10. The method of claim 8, wherein the online client device and the offline client device are enrolled as managed devices with a management service.

11. The method of claim 8, wherein the device payload comprises a software update for installation on the offline client device.

12. The method of claim 8, wherein the offline client device lacks access to the network, and wherein the offline client device transmits the check-in data corresponding to the offline device to the online device using a peer-to-peer (P2P) communication channel that is encrypted using a P2P channel certificate shared between the online client device and the offline client device.

13. A non-transitory computer-readable medium embodying program instructions that, when executed, cause a computing device to at least:

obtain device check-in data corresponding to an online client device over a network from the online client device, the device check-in data comprising device status information about the online client device, wherein the online client device is associated with a user account;

identify an offline client device associated with the user account, wherein the offline client device has failed to provide device check-in data corresponding to the offline client device for a threshold period of time;

determine, based on a device record associated with the offline client device, an update to a security policy of the offline client device;

transmit a request to communicate with the offline client device to the online client device;

generate a device payload for the offline client device, the device payload including the update to the security policy, wherein the security policy is enforced on the offline client device by a management agent executing on the offline client device;

transmit the device payload to the online client device, wherein the online client device provides the device payload to the offline client device, wherein the management agent on the offline client device receives the device payload and installs the update to the security policy on the offline client device to modify one or more security settings on the offline client device based on the update;

receive, from the online client device, the device check-in data corresponding to the offline client device, the device check-in data including a device identifier of the offline client device and device status indicating that the update to the security policy has been installed on the offline client device, wherein the offline client device transmits, to the online client device, the device check-in data corresponding to the offline client device in response to loading the device payload received from the online client device on the offline client device;

determine a compliance status of the offline client device based on the device check-in data corresponding to the offline client device received from the online client device; and update the device record of the offline client device to reflect the compliance status, which indicates that the update to the security policy has been installed on the offline client device.

14. The non-transitory computer-readable medium of claim 13, wherein the machine-readable instructions further cause the computing device to at least:

encrypt the device payload using a public key corresponding to the offline client device, wherein the public key further corresponds to a device certificate generated by a management service with which the online client device and the offline client device are enrolled as managed devices.

15. The non-transitory computer-readable medium of claim 13, wherein the online client device and the offline client device are enrolled as managed devices with a management service.

16. The non-transitory computer-readable medium of claim 13, wherein the device payload comprises a software update for installation on the offline client device.

17. The non-transitory computer-readable medium of claim 13, wherein the online client device transmits the device payload to the offline client device over a peer-to-peer (P2P) communication channel, wherein the P2P communication channel is encrypted using a P2P channel certificate shared between the online client device and the offline client device.

* * * * *